US011703262B2

(12) United States Patent
Vetter

(10) Patent No.: US 11,703,262 B2
(45) Date of Patent: Jul. 18, 2023

(54) COLD GENERATOR AND REFRIGERATING PLANT HAVING A COLD GENERATOR

(71) Applicant: BITZER Kuehlmaschinenbau GmbH, Sindelfingen (DE)

(72) Inventor: Frank Vetter, Neustetten (DE)

(73) Assignee: BITZER KUEHLMASCHINENBAU GMBH, Sindelfingen (DE)

( * ) Notice: Subject to any disclaimer, the term of this patent is extended or adjusted under 35 U.S.C. 154(b) by 471 days.

(21) Appl. No.: 16/818,254

(22) Filed: Mar. 13, 2020

(65) Prior Publication Data

US 2020/0217570 A1 Jul. 9, 2020

Related U.S. Application Data

(63) Continuation of application No. PCT/EP2017/073020, filed on Sep. 13, 2017.

(51) Int. Cl.
| | |
|---|---|
| *F25B 39/00* | (2006.01) |
| *F25B 49/02* | (2006.01) |
| *F25B 39/04* | (2006.01) |

(52) U.S. Cl.
CPC ............ *F25B 49/027* (2013.01); *F25B 39/04* (2013.01); *F25B 2339/043* (2013.01); *F25B 2339/047* (2013.01); *F25B 2400/05* (2013.01); *F25B 2400/13* (2013.01); *F25B 2600/0261* (2013.01)

(58) Field of Classification Search
CPC .. F25B 49/027; F25B 39/04; F25B 2339/043; F25B 2339/047; F25B 2400/05; F25B 2400/13; F25B 2600/0261
See application file for complete search history.

(56) References Cited

U.S. PATENT DOCUMENTS

| 4,364,239 A * | 12/1982 | Chapelle ................. F25B 40/04 |
| | | 62/235.1 |
| 5,462,113 A * | 10/1995 | Wand .................... F28D 9/0093 |
| | | 165/140 |
| 6,564,862 B1 | 5/2003 | Persson |
| 2012/0060550 A1* | 3/2012 | Mann .................... F28D 9/0093 |
| | | 62/513 |
| 2016/0375745 A1 | 12/2016 | Gottfried et al. |

FOREIGN PATENT DOCUMENTS

| WO | WO 2008/061362 | 5/2008 |
| WO | WO 2012/135864 | 10/2012 |
| WO | WO 2015/140034 | 9/2015 |

* cited by examiner

*Primary Examiner* — Jonathan Bradford
(74) *Attorney, Agent, or Firm* — Reinhart Boerner Van Deuren P.C.

(57) ABSTRACT

A cold generator incorporates a heat exchanger unit integrating a heat-emitting heat exchanger and a heat-absorbing heat exchanger. The heat exchanger unit has a flow path layer stack built up in a stacked construction. In order to form the heat-emitting heat exchanger in the flow path layer stack, at least one heat-emitting refrigerant flow path and at least one heat-absorbing second heat transport flow path are provided. A second heat transport medium guided in a second heat transport circuit is arranged to flow through the second heat transport flow path. At least one heat-absorbing refrigerant flow path and at least one heat-emitting first heat transport flow path are provided in order to form the heat-absorbing heat exchanger in the flow path layer stack with a first heat transport medium guided in a first heat transport circuit that is arranged to flow through the first heat transport flow path.

40 Claims, 13 Drawing Sheets

COLD GENERATOR AND REFRIGERATING PLANT HAVING A COLD GENERATOR

CROSS-REFERENCE TO RELATED PATENT APPLICATION

This application is a continuation of International application number PCT/EP2017/073020 filed on Sep. 13, 2017.

This patent application claims the benefit of International application No. PCT/EP2017/073020 of Sep. 13, 2017, the teachings and disclosure of which are hereby incorporated in their entirety by reference thereto.

BACKGROUND OF THE INVENTION

The invention relates to a cold generator, comprising a refrigerant circuit with a refrigerant compressor arranged in the refrigerant circuit, a heat-emitting heat exchanger connected to a high-pressure connection of the refrigerant compressor, an expansion member following on from the heat-emitting heat exchanger, and a heat-absorbing heat exchanger following on from the expansion member, which heat-absorbing heat exchanger is in turn connected on the output side to an intake connection of the refrigerant compressor.

Cold generators of this kind are known from the prior art.

In these cold generators, the refrigerant circulates in the refrigerant circuit at a high pressure, so all components of the refrigerant circuit have to be subjected to complex production, inspection and maintenance processes, and therefore large spatial distances can only be provided between the heat-emitting heat exchanger and the heat-absorbing heat exchanger with a high capital outlay.

SUMMARY OF THE INVENTION

The object of the invention is therefore to improve a cold generator of the generic kind in such a way that the cold generator comprises a heat exchanger unit in which the heat-emitting heat exchanger and the heat-absorbing heat exchanger are integrated, that the heat exchanger unit comprises a flow path layer stack which is built up in a stacked construction and has flow path layers arranged successively in a stack direction, that in order to form the heat-emitting heat exchanger in the flow path layer stack, at least one heat-emitting refrigerant flow path and at least one heat-absorbing second heat transport flow path are provided, that a second heat transport medium guided in a second heat transport circuit flows or is arranged to flow through the second heat transport flow path, that at least one heat-absorbing first refrigerant flow path and at least one heat-emitting heat transport flow path are provided in order to form the heat-absorbing heat exchanger in the flow path layer stack, and that a first heat exchanger medium guided in a first heat transport circuit flows or is arranged to flow through the first heat transport flow path.

The advantage of the solution according to the invention can be seen to lie in the fact that the actual refrigerant circuit merely requires the circulation of refrigerant between the refrigerant compressor and the heat exchanger unit, whereas the heat is transported along the necessary routes by means of a first heat transport circuit for supplying heat to the heat exchanger unit and by means of a second heat transport circuit for dissipating heat from the heat exchanger unit, this being achievable by simple technical means in comparison to a refrigerant circuit.

In particular, a cold generator of this kind makes it possible to achieve small volumes for the refrigerant, such that the hazard potential owing to the refrigerant volume may be significantly reduced, since the hazard potential owing to the heat transport circuits is negligible.

In accordance with a particularly advantageous solution, the at least one heat-emitting refrigerant flow path and the at least one heat-absorbing second heat transport flow path for the second heat transport medium are arranged in the heat-emitting heat exchanger in flow path layers arranged successively in the stack direction, and the heat exchange occurs parallel to the stack direction so that the losses owing to the heat exchange are minimal.

In accordance with a further advantageous solution, the at least one heat-absorbing refrigerant flow path and the at least one heat-emitting heat transport flow path for the first heat transport medium are arranged in the heat-absorbing heat exchanger in flow path layers arranged successively in the stack direction, and the heat exchange occurs parallel to the stack direction.

By way of a configuration of this kind of the heat exchanger unit, the losses during the heat exchange between the heat transport media and the refrigerant are minimal.

In principle, the flow path layer stack could be embodied such that one flow path is provided in each flow path layer.

The heat exchanger unit according to the invention can be realised particularly advantageously if the heat-emitting refrigerant flow path and the heat-emitting first heat transport flow path are arranged in one flow path layer of the flow path layer stack.

It is also favourable if the heat-absorbing refrigerant flow path and the heat-absorbing second heat transport flow path are arranged in one flow path layer of the flow path layer stack.

The heat exchanger unit can thus be realised from a flow path layer stack having just two different flow path layer stacks which are preferably stacked one above the other in alternation.

No further details have been provided in respect of the arrangement of the heat-emitting heat exchanger and the heat-absorbing heat exchanger in conjunction with the previous explanation of the individual embodiments.

In accordance with one advantageous solution, the heat-emitting heat exchanger and the heat-absorbing heat exchanger are arranged adjacently in the heat exchanger unit in a direction transverse to the stack direction.

It is particularly advantageous in this context if the heat-emitting heat exchanger and the heat-absorbing heat exchanger are arranged at a spacing from one another in a direction transverse to the stack direction, such that a gap remains between them.

A spacing of this kind of the heat exchangers arranged adjacently in a direction transverse to the stack direction can be utilised particularly favourably by arranging an inner heat exchanger between the heat-emitting heat exchanger and the heat-absorbing heat exchanger.

An inner heat exchanger of this kind can be realised expediently in that it is formed by an overlapping of the heat-emitting refrigerant flow path in one flow path layer and of the heat-absorbing refrigerant flow path in the adjacent flow path layer.

The efficiency of the heat exchanger unit can be increased even further by an inner heat exchanger of this kind.

It is in particular provided in this context that the refrigerant is cooled in the region of a refrigerant outlet side of the heat-emitting refrigerant flow path and that the refrigerant is heated in the region of a refrigerant outlet side of the heat-absorbing refrigerant flow path, such that a supercooling of the refrigerant before its expansion in the expansion member is thus possible.

In accordance with a solution that is particularly advantageous in respect of its construction, the heat-emitting refrigerant flow path has a refrigerant inlet side and a refrigerant outlet side and the heat-absorbing refrigerant flow path has a refrigerant inlet side and a refrigerant outlet side, and the refrigerant outlet side of the heat-emitting refrigerant flow path and the refrigerant outlet side of the heat-absorbing refrigerant flow path are arranged overlapping one another.

In addition, it is advantageous in the solution according to the invention if there is a possibility to supply heat at times to the first heat transport circuit, for example so as to be able to defrost a heat exchanger arranged in the first heat transport circuit, if necessary.

For this reason, it is preferably provided that, in order to temporarily heat the first heat transport medium in the first heat transport circuit in the heat exchanger unit, heat can be supplied to the first heat transport medium, wherein the flow paths for the first heat transport medium and the second heat transport medium remain separate and in particular distinct, that is to say there is no exchange between the heat transport media or contact of the heat transport media with one another, and instead the first heat transport medium and the second heat transport medium are guided permanently in separate flow paths.

For example, in an advantageous solution the first heat transport medium can be heated in that the cold generator has a redirection system for heat transport medium, by means of which system heat can be supplied to the first heat transport medium in the heat exchanger unit by redirecting the heat transport medium.

A heating of this kind of the first heat transport medium can be implemented particularly easily if the heat exchanger unit comprises a heating heat exchanger for temporarily heating the first heat transport medium.

In accordance with one possibility for construction in this regard, in order to form the heating heat exchanger, at least one flow path layer of the heat exchanger unit has at least one additional flow path for temporarily heating the first heat transport medium.

For example, it is provided that the at least one additional flow path is provided in a flow path layer which in the stack direction borders one of the heat-emitting first heat transport flow paths for the first heat transport medium, is arranged overlapping therewith, and can be passed through by the second heat transport medium.

Since the second heat transport medium is heated to temperatures which lie significantly above the usual operating temperatures of the first heat transport medium, the first heat transport medium can thus be temporarily heated by this solution in a simple manner.

Alternatively, in accordance with a further advantageous embodiment the at least one additional flow path for heating the first heat transport medium can be passed through by the first heat transport medium, borders the at least one heat-absorbing heat transport flow path for the second heat transport medium in the stack direction, and is arranged overlapping therewith such that it is thus also possible to heat the first heat transport medium temporarily by the second heat transport medium, for example in order to defrost the heat exchanger provided in the first heat transport circuit.

To realise the at least one additional flow path, at least one additional flow path layer is preferably provided in the flow path layer stack of the heat exchanger unit, in which the additional flow path is arranged.

An additional flow path of this kind could be passed through by any kind of warm or hot medium so as to heat the first heat transport medium as a result of the fact that said additional flow path borders one of the heat-emitting heat transport flow paths.

Alternatively to providing an additional flow path layer, another advantageous embodiment provides that the at least one additional flow path is arranged in the same flow path layer as one of the heat transport flow paths.

In accordance with a particularly favourable solution the at least one first heat transport flow path through which the first heat transport medium passes extends from an inlet side to an outlet side, and the additional heat transport path branches off from the first heat transport flow path and runs to a heating outlet side thereof.

In other words, the additional flow path represents a branching to the first heat transport flow path, and therefore the first heat transport medium is supplied to the first heat transport flow path and in so doing either flows through the first heat transport flow path from the inlet side thereof to the outlet side thereof, or is diverted in such a way that it flows through the additional flow path and exits in this from the heating outlet side, wherein it is heated in the additional flow path on the way to the heating outlet side.

In this case the additional flow path is arranged in the same flow path layer as the first heat transport flow path.

For an optimal configuration of the heating heat exchanger, it has proven to be advantageous if the at least one additional flow path is formed by a partial surface region of a flow path layer of one of the flow path layers, such that only part of a flow path layer is necessary to realise the additional flow path, and therefore the heat exchanger unit can be made compact.

For an efficient heat exchange it is provided in this regard that the additional flow path is arranged overlapping with the second heat transport flow path such that a heat exchange can be realised easily between the first heat transport flow path and the second heat transport flow path for heating the first heat transport medium.

However, it is also conceivable to arrange the additional flow path such that it overlaps with the heat-emitting refrigerant flow path, such that, due to the heat-emitting refrigerant flow path, it is also possible to heat the first heat transport medium if this flows through the additional flow path.

In accordance with a solution that is particularly favourable in respect of its construction, the additional flow path overlaps with an outlet side of the second heat transport flow path, such that a transfer of heat from the second heat transport flow path to the first heat transport flow path can thus be realised optimally.

In accordance with a further advantageous solution, the first heat transport medium is heated by means of a redirection system for refrigerant.

For example, it is possible for refrigerant heated by the compression to be introduced into the additional flow path.

In accordance with another advantageous solution, by means of a redirection system for refrigerant, heated refrigerant is temporarily supplied at high pressure to the heat-absorbing refrigerant flow path by the compression instead of expanded refrigerant at low pressure by the expansion member, such that the first heat exchanger medium can thus also be heated in the usually heat-absorbing heat exchanger of the heat exchanger unit.

No further details have been provided as yet in respect of the type of heat transport media.

In particular, it is provided that the heat-absorbing heat flow path is arranged to guide a liquid heat transport medium, such that the heat dissipation from the heat-emitting heat exchanger can be easily realised.

One advantageous solution in particular provides that the second heat transport medium circulating in the second heat transport circuit is a liquid heat transport medium, and that in particular a second heat-emitting heat exchanger is connectable to the second heat transport circuit, by means of which second heat-emitting heat exchanger heat can then be dissipated for example to the surrounding environment or to another heat-absorbing medium.

The absorption of heat can also be implemented in a technically simple way if the heat-emitting heat transport flow path is configured to guide a liquid heat transport medium, since, with a liquid heat transport medium, heat can be transferred by technically simple means.

An advantageous solution for example provides that the first heat transport medium circulating in the first heat transport circuit is a liquid heat transport medium, and in particular a heat-absorbing heat exchanger is connectable to the first heat transport circuit, which heat-absorbing heat exchanger can be used to cool the material to be cooled or the objects to be cooled.

With regard to the construction of the flow path layers in the flow path layer stack, no further details have as yet been provided.

For example, the flow path layer stack could be constructed as per U.S. Pat. No. 6,564,862.

Another advantageous solution thus provides that the flow path layer stack is formed by structural layers defining the various flow paths in the various flow path layers, and by cover layers closing the structural layers in the stack direction.

In particular, the structural layers are constructed such that they are produced from flat material with cut-out contours, which, however, are open transversely to the structural layer upward and downward, and thus are closed by the cover layers.

It could be provided in principle that two cover layers are provided for each structural layer.

The heat exchange in the stack direction is particularly efficient, however, if there is a cover layer arranged between each two structural layers arranged successively in the stack direction, wherein this cover layer closes each of the structural layers on sides facing towards one another, transversely to the stack direction.

In particular, the cover layers are formed from a much thinner flat material than the structural layers, for example from a flat material that is at least 3 times thinner, in particular so as to optimise the heat exchange in the stack direction.

No further details have as yet been provided in respect of elements associated with the cold generator.

In accordance with one advantageous solution, the cold generator, besides the heat exchanger unit, also comprises all refrigerant conduits leading to the refrigerant flow paths and the expansion member of the refrigerant circuit, such that all refrigerant-guiding components are integrated in the cold generator.

In particular, the expansion member is integrated in the corresponding refrigerant conduit.

In accordance with a further advantageous embodiment of the cold generator, this has conduit portions of the second heat transport circuit connected to the heat-absorbing heat transport flow path layer and leading to coupling elements, such that the coupling elements provide a simple possibility for separating the second heat transport circuit between a heat exchanger associated with said circuit and the heat-absorbing heat transport flow path layer.

In addition it is likewise advantageous if the cold generator has conduit portions of the first heat transport circuit connected to the heat-emitting heat transport flow path layer and leading to coupling elements, such that also in the first heat transport circuit there is a simple possibility for the separation, more specifically between the heat exchanger provided in the first heat transport circuit and the heat-emitting heat transport flow path layer in the heat exchanger unit.

In particular the cold generator can thus also be separated both from the second heat transport circuit and from the first heat transport circuit in the event of replacement for another cold generator.

A further advantageous solution provides that the cold generator comprises a circulating pump for the first heat transport circuit, such that this circulating pump is also part of the cold generator.

In order to be able to combine the components comprised by the cold generator to form a single unit in a simple way, it is preferably provided that the components comprised by the cold generator are combined by means of a module base to form a cold generator module.

In this regard it is in particular provided that at least one of the refrigerant compressor and the heat exchanger unit are held on the module base, whereas the other components of the cold generator are either held on the module base, for example the coupling elements, and/or the circulating pump of the first heat transport circuit, or the other components, such as the conduits of the refrigerant circuit, can be held on the refrigerant compressor and/or the heat exchanger unit.

The cold generator according to the invention makes it possible in particular to reduce the volume of the refrigerant in the refrigerant circuit.

It is particularly favourable if the weight of the refrigerant in the refrigerant circuit is less than 150 grams.

It is provided in particular that the volume of the condensed refrigerant in the refrigerant circuit is less than five hundred cubic centimetres, even better less than four hundred cubic centimetres.

Since the condensed refrigerant is usually located in the heat-emitting refrigerant flow path, it is preferably provided that the volume of the heat-emitting refrigerant flow path is less than five hundred cubic centimetres, even better less than four hundred cubic centimetres.

In addition, the invention relates to a refrigerating plant for cooling a space that is to be cooled.

In accordance with the invention, a refrigerating plant of this kind provides that a heat exchanger is arranged in the space that is to be cooled, which heat exchanger is arranged in a first heat transport circuit operating with liquid first heat transport medium, and that the refrigerating plant has a cold generator in accordance with the preceding claims.

In other words, the above-described cold generator can be easily developed to form a refrigerating plant for cooling the space that is to be cooled, wherein the heat transport between the space that is to be cooled and the cold generator can be realised by means of the first heat transport circuit in a technically simple way, since no refrigerant-guiding conduits have to be guided to the space that is to be cooled, but instead only to the first refrigerant circuit guiding a liquid heat transport medium, which can be realised technically with much simpler components and with a lower inspection and maintenance outlay than a refrigerant circuit.

It is additionally provided in accordance with the invention that the first heat transport medium is a water-based heat transport medium, such that the first heat transport circuit can be realised particularly easily.

It is also provided that the first heat transport medium is circulated in the first heat transport circuit at a pressure level of less than 4 bar, even better less than 3 bar, and in particular by generation of a pressure difference of at most 2 bar.

In respect of the dissipation of the heat from the heat exchanger unit it has proven to be particularly favourable if the refrigerating plant has a heat exchanger which is arranged in a second heat transport circuit operating with liquid second heat transport medium, such that the dissipation of the heat from the heat exchanger unit can also be realised by means of the second heat transport circuit in a simple way and by technical simple means.

It is further preferably provided also in respect of the second heat transport medium that this is a water-based heat transport medium.

In particular, the second transport medium can also be circulated in the second heat transport circuit in a simple way at a pressure level of less than 4 bar, even better less than 3 bar, and in particular by generation of a pressure difference of at most 2 bar.

Further features and advantages of the invention are the subject of the following description and the depiction in the drawings of a number of embodiments.

DETAILED DESCRIPTION OF THE INVENTION

Figure 1:
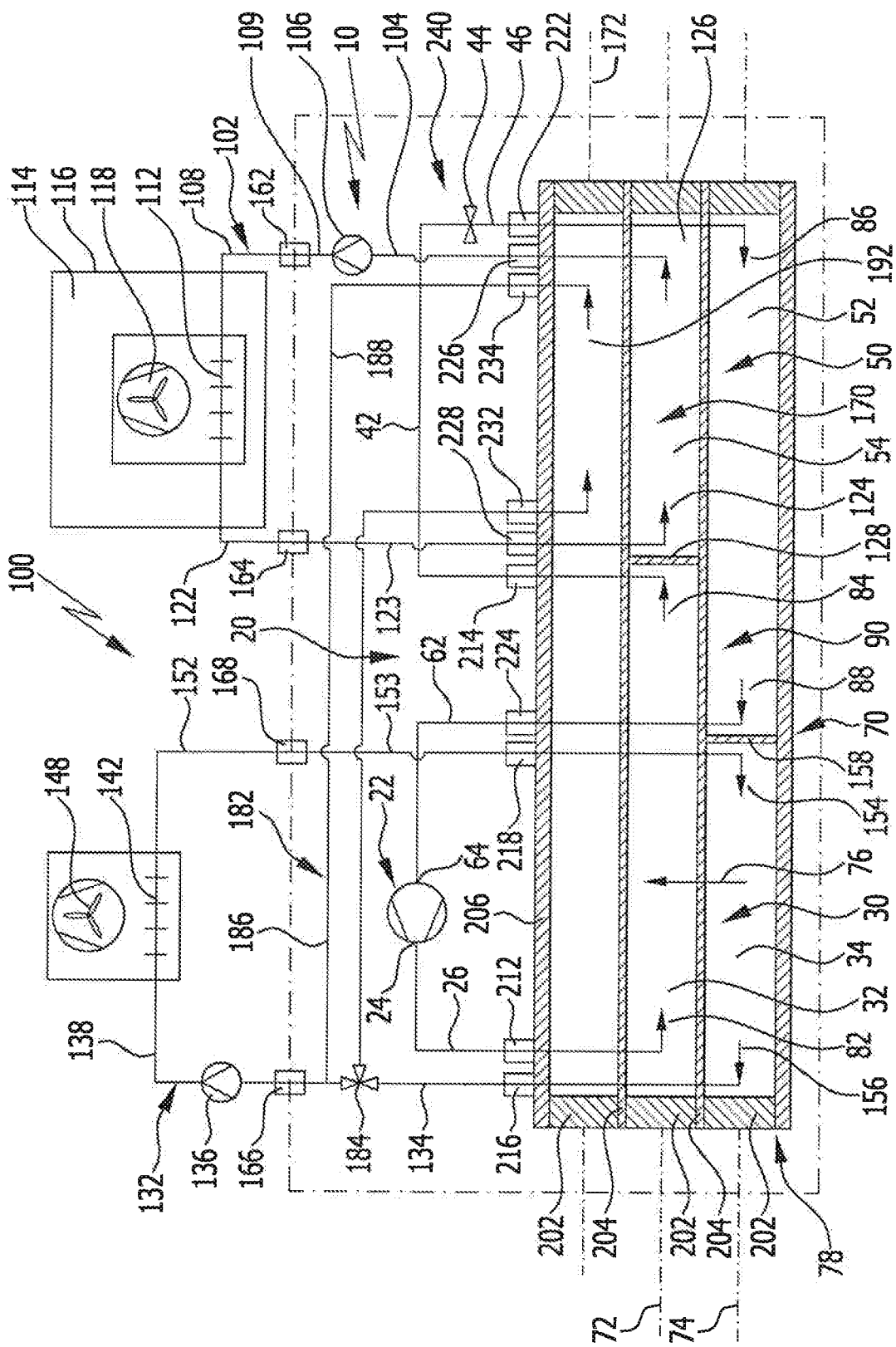
FIG. 1 shows a schematic depiction of a first exemplary embodiment of a cold generator according to the invention used in a first embodiment of a refrigerating plant.
Figure 2:
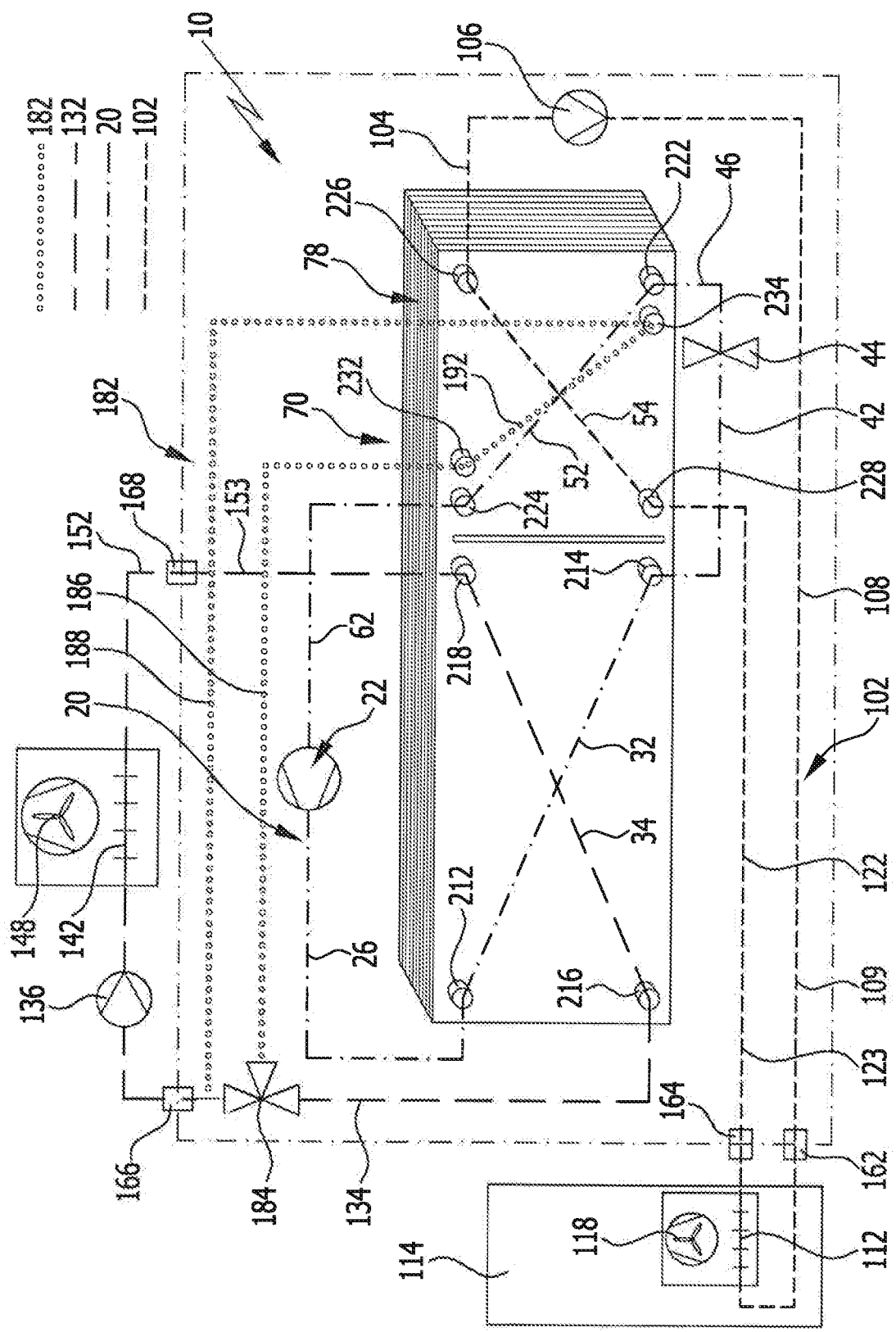
FIG. 2 shows a schematised depiction of the media guidance in the first exemplary embodiment of the cold generator according to the invention and the refrigerating plant.

A first exemplary embodiment of a cold generator shown in FIG. 1 and denoted as a whole by 10 comprises a refrigerant circuit denoted as a whole by 20, in which a refrigerant compressor 22 is arranged, the high-pressure connection 24 of which is connected to by a high-pressure conduit 26, which leads to a heat-emitting heat exchanger 30, which comprises a heat-emitting refrigerant flow path 32, which is passed through by the refrigerant supplied by means of the high-pressure conduit 26 and heated by the compression process, wherein the refrigerant flow path 32 delivers heat to a heat-absorbing heat transport flow path 34 thermally coupled to this heat exchanger 30.

Once it has passed through the heat-emitting refrigerant flow path 32, the refrigerant is supplied by means of a conduit 42 to an expansion member 44, in which the refrigerant is expanded, is then supplied by means of a supply conduit 46 to the heat-absorbing heat exchanger 50, and flows through a heat-absorbing refrigerant flow path 52 provided in the heat exchanger 50, which refrigerant flow path is thermally coupled to a heat-emitting heat transport flow path 54.

The refrigerant then flows from the heat-absorbing refrigerant flow path 52 by means of a return conduit 62 to an intake connection 64 of the refrigerant compressor 22, such that the refrigerant circuit 20 constitutes a closed circuit for the refrigerant.

In the cold generators according to the invention, both of the heat-emitting heat exchanger 30 and of the heat-absorbing heat exchanger 50 are integrated in a heat exchanger unit which is denoted as a whole by 70 and has a plurality of flow path layers 72 and 74, in which flow paths 32, 34, 52, 54 run, wherein the flow path layers 72, 74 are stacked one above the other in a stack direction 76 to form a flow path layer stack 78 and in particular are thermally coupled in the stack direction 76.

In FIG. 1 the flow path layers 72 and 74 are depicted merely in an exemplary manner by two flow path layers 72, 74, and in a technical implementation the flow path layer stack 78 comprises a plurality of flow path layers 72, 74 arranged one above the other in alternation.

For example, as is shown in FIG. 1, on the one hand the heat-emitting refrigerant flow path 32 and on the other hand the heat-emitting heat transport flow path 54 are provided in the flow path layer 72, whereas the heat-absorbing heat transport flow path 34 and the heat-absorbing refrigerant flow path 52 are provided in the flow path layer 74.

The heat-emitting refrigerant flow path 32 and the heat-absorbing heat transport flow path 34 are arranged with maximum overlap in the flow path layer stack 78 transversely to the stack direction 76, and in addition the heat-emitting heat transport flow path 54 is also arranged with maximum overlap with the heat-absorbing refrigerant flow path 52 transversely to the stack direction 76, such that an optimal heat transfer occurs between the heat-emitting refrigerant flow path 32 and the heat-absorbing heat transport flow path 34 and between the heat-emitting heat transport flow path 54 and the heat-absorbing refrigerant flow path 52, in particular due to the thermal coupling occurring in the stack direction 76.

As shown in FIG. 1, the heat-absorbing heat exchanger 30 and the heat-emitting heat exchanger 50 are preferably arranged in the heat exchanger unit 70 at a spacing from one another transversely to the stack direction 76.

Furthermore, for example the heat-emitting refrigerant flow path 32 extends in the flow path layer 72 beyond the heat-absorbing heat transport flow path 34 arranged in the flow path layer 74 and overlaps with the heat-absorbing refrigerant flow path 52, which is arranged in the flow path layer 74, which extends transversely to the stack direction 76 beyond the heat-emitting heat transport flow path 54 arranged in the flow path layer 72.

In addition, a refrigerant inlet side 82 of the heat-emitting refrigerant flow path 32 is expediently arranged in the region overlapping with the heat-absorbing heat transport flow path 34, and a refrigerant outlet side 84 of the heat-emitting refrigerant flow path 32 is arranged in the region overlapping with the heat-absorbing refrigerant flow path 52.

At the same time, a refrigerant inlet side 86 of the heat-absorbing refrigerant flow path 52 is arranged in the region overlapping with the heat-emitting heat transport flow path 54, and a refrigerant outlet side 88 is arranged in the region overlapping with the heat-emitting refrigerant flow path 32.

This means that the refrigerant flowing in the heat-emitting refrigerant flow path 32 firstly releases heat to the heat-absorbing heat transport flow path 34 in the region overlapping therewith, and then releases heat in the vicinity of its refrigerant outlet side 84 to the heat-absorbing refrigerant flow path 52 in the vicinity of the refrigerant outlet side 88 thereof, such that, by means of the expanded and heat-absorbing refrigerant flowing through the heat-absorbing refrigerant flow path 52 starting from the refrigerant inlet side 86, in the vicinity of the refrigerant outlet side 88 on the one hand the refrigerant flowing through the heat-emitting refrigerant flow path 32 is subjected to an additional cooling before it enters the conduit 42, and on the other hand the refrigerant flowing through the heat-absorbing refrigerant flow path 52 is subjected to an additional heating just before the refrigerant outlet side 88, such that an internal heat exchanger 90 is present in the overlap region between the heat-emitting refrigerant flow path 32 and the heat-absorbing refrigerant flow path 52, in particular in the vicinity of the refrigerant outlet sides 84 and 88 thereof, which internal heat exchanger on the one hand additionally cools the refrigerant before entry into the conduit 42 and thus before expansion by the expansion member 44, and on the other hand also slightly heats the refrigerant flowing through the heat-absorbing refrigerant flow path 52 additionally prior to entry in the return conduit 62 and thus prior to entry into the refrigerant compressor 22.

With the solution according to the invention, in particular by integration of the refrigerant flow paths 32 and 52 into the heat exchanger unit 70, the volume of the refrigerant in the refrigerant circuit 20 can be minimised, and therefore a refrigerant circuit 20 having a particularly low potential for refrigerant emissions can be realised on account of the low refrigerant amount, wherein in particular in the refrigerant circuit 20 the volume of the conduits between the refrigerant flow paths 32 and 52 and the connection to the expansion member 44, which is arranged outside the heat exchanger unit 70, is also minimised.

No further details have as yet been provided in respect of the heat transport from and to the heat transport flow paths 54 and 34.

For example, with use of the cold generator 10 in a first embodiment of a refrigerating plant 100, a first heat transport circuit 102 is provided for supplying heat to the heat transport flow path 54, in which first heat transport circuit a liquid heat transport medium, for example water-based, in particular a mixture of water and glycol or water and salt, etc., for example with pressure differences less than 2 bar, is circulated, wherein an intake conduit 104 of the first heat transport circuit 102 is guided from the heat transport flow path 54 to a circulating pump 106, from which a transport conduit 108 then runs to a heat exchanger 112, which is arranged in a space 114 that is to be cooled, for example arranged in a stationary object 116, in order to cool this space 114.

For example, the stationary object 116 is a refrigeration unit and the space to be cooled is a storage compartment for chilled goods in the refrigeration unit, wherein the air in the space 114 that is to be cooled is additionally circulated by a fan 118 associated with the heat exchanger 112 so as to create cooling conditions in the space 114 that is to be cooled.

It is particularly favourable in this case if the cold generator 10, in particular as a cold generator module 10, is associated with the refrigeration unit, in particular directly, and for example is arranged on the refrigeration unit, such that the first heat transport circuit 102 can be guided directly into the refrigeration unit over short paths so as to absorb heat there by means of the heat exchanger 112 arranged in the refrigeration unit and cool the interior 114 thereof.

A return conduit 122 of the first heat transport circuit 102 runs from the heat exchanger 112 to the heat transport flow path 54, such that overall the heat transport medium is able to absorb heat through the heat exchanger 112 in the space 114 that is to be cooled and to release it in the heat-dissipating heat transport flow 54 to the heat-absorbing refrigerant flow path 52 on account of the good thermal coupling already described.

In particular, in the heat transport flow path 54 there is an outlet side 126 thereof arranged overlapping with the refrigerant inlet side 86 of the heat-absorbing flow path 52, and an inlet side 124 opposite the outlet side 126 in the vicinity of a partition 128, which in the flow path layer 72 separates the heat-emitting refrigerant flow path 32 from the heat-emitting heat transport flow path 54.

The first heat transport circuit 102 is thus able to absorb heat by means of the heat exchanger from the space 114 that is to be cooled and to deliver it to the heat-absorbing refrigerant flow path 52 by the thermal coupling of the heat transport path 54 to said heat-absorbing refrigerant flow path.

In the exemplary embodiment shown in FIG. 1 it is preferably provided that the intake conduit 104 and the circulating pump 106 are also arranged in the cold generator 10, in particular in the cold generator module thereof, whereas part of the transport conduit 108 and of the return conduit 122 are parts of the cold generator and another part runs outside the cold generator 10.

In order to transport away the heat supplied to the heat-absorbing heat transport flow path 34, this path is connected in the refrigerating plant 100 to a second heat transport circuit 132, which likewise has an intake conduit 134 leading away from the heat transport flow path 34, which intake conduit leads to a circulating pump 136, which is connected by means of a transport conduit 138 to a heat exchanger 142, which for example interacts with the ambient air or another heat-absorbing medium.

For example, a fan 148 is associated with the second heat exchanger 142 and allows ambient air for example to flow through the heat exchanger 142.

A return conduit 152 in turn leads from the heat exchanger 142 into the heat-absorbing heat transport flow path 34, wherein an outlet side 156 of the heat-absorbing heat transport flow path 34 is arranged overlapping with the refrigerant inlet side 82 of the heat-emitting refrigerant flow path 32, and an inlet side 154 of the heat-absorbing heat transport flow path 34 opposite the outlet side 156 is arranged in the vicinity of a partition 158, which in the flow path layer 74 separates the heat-absorbing refrigerant flow path 52 from the heat-absorbing heat transport flow path 34.

A liquid heat transport medium, in particular a water-based heat transport medium, for example at pressure differences less than 2 bar, is also circulated in the second heat transport circuit 132, and for example comprises a mixture of water and salt or water and glycol, etc.

Since the second heat transport circuit 132 usually transports heat at a temperature level that is much higher than room temperature, this circuit may also run over long paths as necessary, for example so as to transport heat from the cold generator 10, for example arranged in a building and in particular directly associated with the refrigeration unit, as far as the heat exchanger 142 arranged on an outer side or on a roof of the building.

In the second heat transport circuit 132, for example part of the intake conduit 134 and part of the return conduit 152 runs in the cold generator 10, and another part runs outside the cold generator 10.

In order to be able to easily replace the cold generator 10 as a whole as necessary, quick coupling elements 162, 164, 166, 168 are provided for example in the transport conduit 108, in the return conduit 122, in the intake conduit 134, and in the return conduit 152, so as to enable a separation of the parts of the heat transport circuits 102 and 132 situated outside the cold generator 10 from the parts of the heat transport circuits 102 and 132 installed fixedly in the cold generator 10 in a simple way and a connection to a replacement cold generator, in particular to a replacement cold generator module.

Since, in the case of the heat exchanger 112 which is intended to draw heat from the area 114 that is to be cooled, a defrosting is necessary at certain intervals, it is necessary to heat the first heat transport medium, which is circulated in the first heat transport circuit 102 by the circulating pump 106, in order to defrost the heat exchanger 112.

To this end, the heat exchanger unit 70 comprises a heating heat exchanger 170 for the first heat transport medium, for the formation of which, in the first exemplary embodiment, at least one or more further flow path layers 172 are associated with the heat exchanger unit 70, wherein the at least one further flow path layer 172 in the first exemplary embodiment has an additional flow path 192, which is arranged such that it is arranged overlapping with the heat-emitting heat transport flow path 54, for example on a side opposite the heat-absorbing refrigerant flow path 52, and is likewise thermally coupled thereto in the stack direction 76 and thus forms the heating heat exchanger 170.

It is thus possible to supply heat transport medium from the second heat transport circuit 132 by means of a redirection system 182 and to thus heat the heat transport medium in the heat-emitting heat transport flow path 54 such that overall the entire heat transport medium circulating in the first heat exchanger circuit 102 can be heated, thus defrosting the heat exchanger 112.

To this end, the redirection system 182 comprises a three-way valve 184 arranged in the intake conduit 134, which valve is switchable such that heat transport medium flowing in the intake conduit 134 in the direction of the circulating pump 136 is supplied from the heat-absorbing heat transport flow path 34 by means of the intake conduit 134 to the three-way valve, is supplied to the heat-emitting flow path 192 in the flow path layer 172 from a branch conduit 186 connectable to the intake conduit 134 by means of the three-way valve 184, and, after having passed through this flow path 192, is received again by a return conduit 188 of the redirection system 182 and is supplied to the intake conduit 134 between the three-way valve 184 and the circulating pump 136, such that lastly the circulating pump 136 firstly draws the heat transport medium, heated in the heat-absorbing heat transport flow path 34, through the flow path 192, before it supplies the heat transport medium to the heat exchanger 142 by means of the transport conduit 138.

This leads, on account of the good thermal coupling between the flow path 192 and the heat-emitting heat transport flow path 54, to a temporary heating on the whole of the heat transport medium in the first heat transport circuit 102, and thus to a defrosting of the first heat exchanger 112 in the space 114 that is to be cooled.

If the three-way valve 184 is switched back, the heat transport medium coming from the heat-absorbing heat transport flow path 34 flows directly again to the circulating pump 136 by means of the intake conduit 134, such that the redirection system 182 is without effect and no further heated second heat transport medium is supplied to the heat transport flow path 192.

Rather, the second heat transport medium in the flow path 192 remains in the heat exchanger unit 70 and adapts in respect of its temperature to the temperature of the first heat transport medium flowing in the heat-emitting heat transport flow path 54.

In respect of the construction of the flow path layer stack 78 with the flow path layers 72, 74 and 172, no further details have as yet been provided in conjunction with the prior explanation of the individual exemplary embodiments.

In accordance with an advantageous solution, each of the flow path layers 72, 74, 172 comprises a structural layer 202 and cover layers 204, which cover layers are arranged on both sides of the structural layer and separate each structural layer 202 from the following structural layer 202.

Each of the structural layers 202, for its part, delimits the respective flow paths in the respective flow path layer 72, 74, 172, for example the refrigerant flow path 32 and the heat transport flow path 54 in the flow path layer 72, or the heat transport flow path 34 and the refrigerant flow path 52 in the flow path layer 74, or for example the heat transport flow path 192 in the flow path layer 172.

In particular, by the particular structural layer 202 in the flow path layer 72, the refrigerant flow path 32 and the heat transport flow path 54 are also separated by the partition 128, and the heat transport path 34 is also separated from the refrigerant flow path 52 in the flow path layer 74 by the partition 158.

In the shown exemplary embodiment of the heat exchanger unit 70, an uppermost structural layer, for example the structural layer 202, is closed off from the surrounding environment by a closure layer 206, wherein connections 212 and 214 for the high-pressure conduit 26 guided to the refrigerant flow path 32 or for the conduit 42 are provided in the termination layer 206, and in addition connections 216, 218 for the second heat transport circuit 132, in particular the intake conduit 134 likewise leading thereto or the return conduit 152 leading to the heat transport flow path 34, are provided.

Furthermore, connections 222 or 224 for the supply conduit 46 coming from the expansion member 44 and for the return conduit 62 are provided in the closure layer 206, and in addition connections 226 and 228 for the first heat transport circuit 102, in particular the intake conduit 104 guided to the heat transport flow path 54 or the return conduit 122, are also provided, and in addition connections 232 and 234 for the branch conduit 186 guided to the heat transport flow path 192 or the return conduit 188 likewise coming from the heat transport flow path 192 are also provided.

Figure 3:
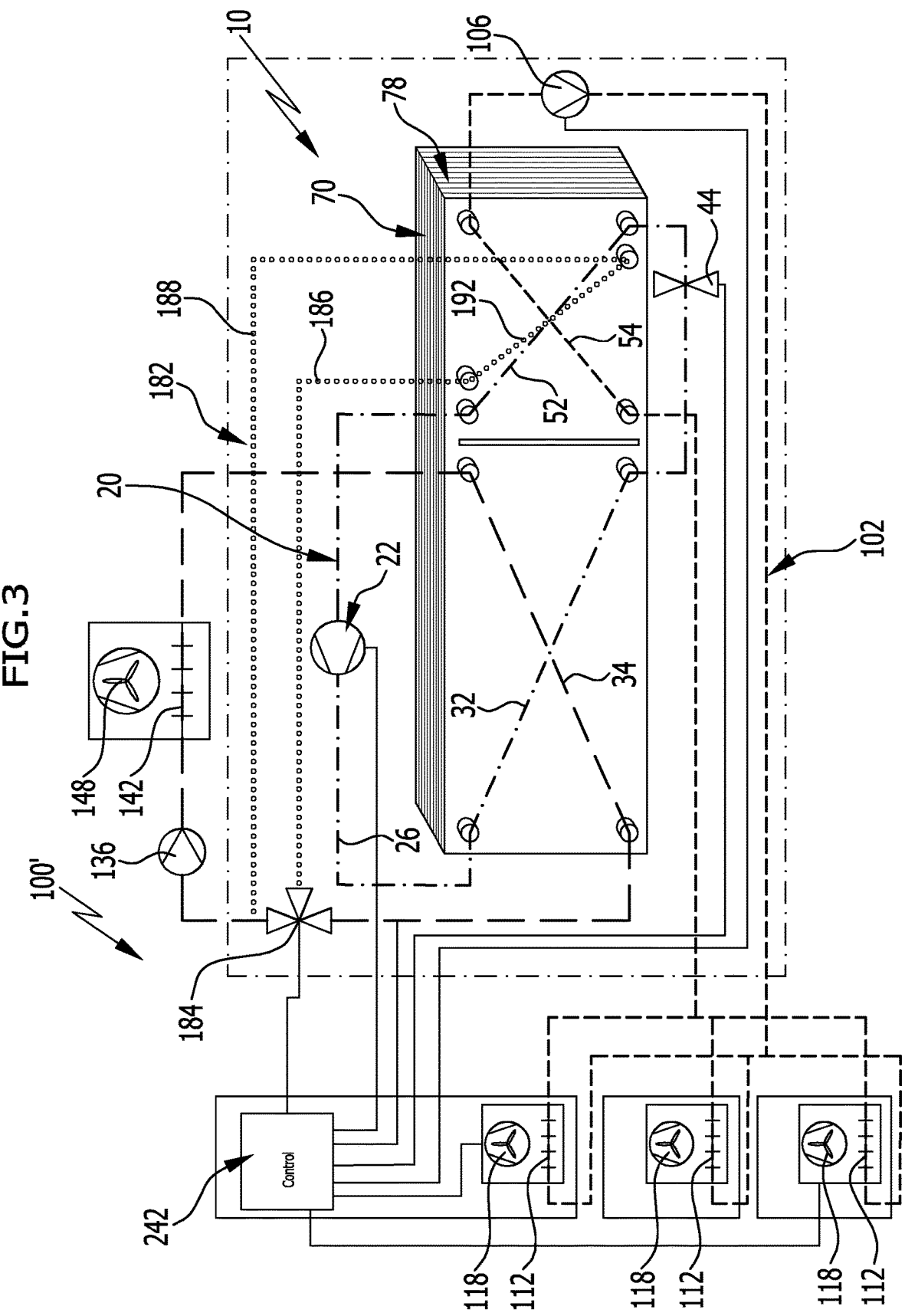
FIG. 3 shows an embodiment of the first exemplary embodiment of the cold generator used in a second embodiment of a refrigerating plant with a control unit and possibly a plurality of heat exchangers.

In order to control the cold generator 10, in particular the cold generator module 10, for example a control unit 242 preferably arranged on a refrigeration unit or possibly on the unit base 240, as shown in FIG. 3, is provided and controls the refrigerant compressor 22, the expansion member 44, the circulating pump 106, and the three-way valve 184, and is thus able to control automatically the defrosting of a heat exchanger 112 or, in the shown second embodiment of the refrigerating plant 100', the defrosting of a plurality of heat exchangers 112, which are connected in parallel in the first heat transport circuit 102.

At the same time, the fan 118 associated with the heat exchangers 112 can also be controlled by means of the control unit 242.

Figure 4:
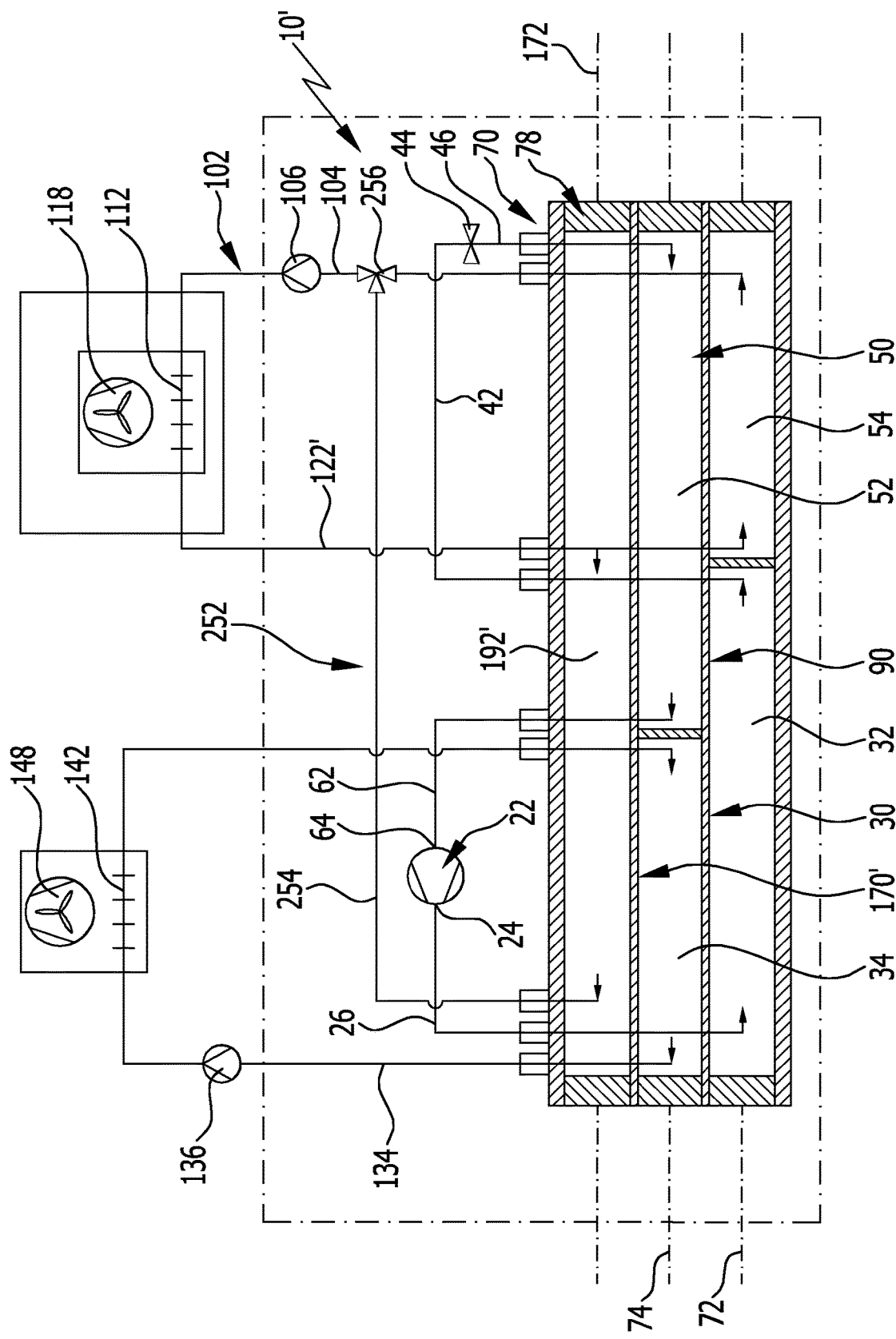
FIG. 4 shows a schematic depiction similar to FIG. 1 of a second exemplary embodiment of a cold generator according to the invention used in the first embodiment of the refrigerating plant.
Figure 5:
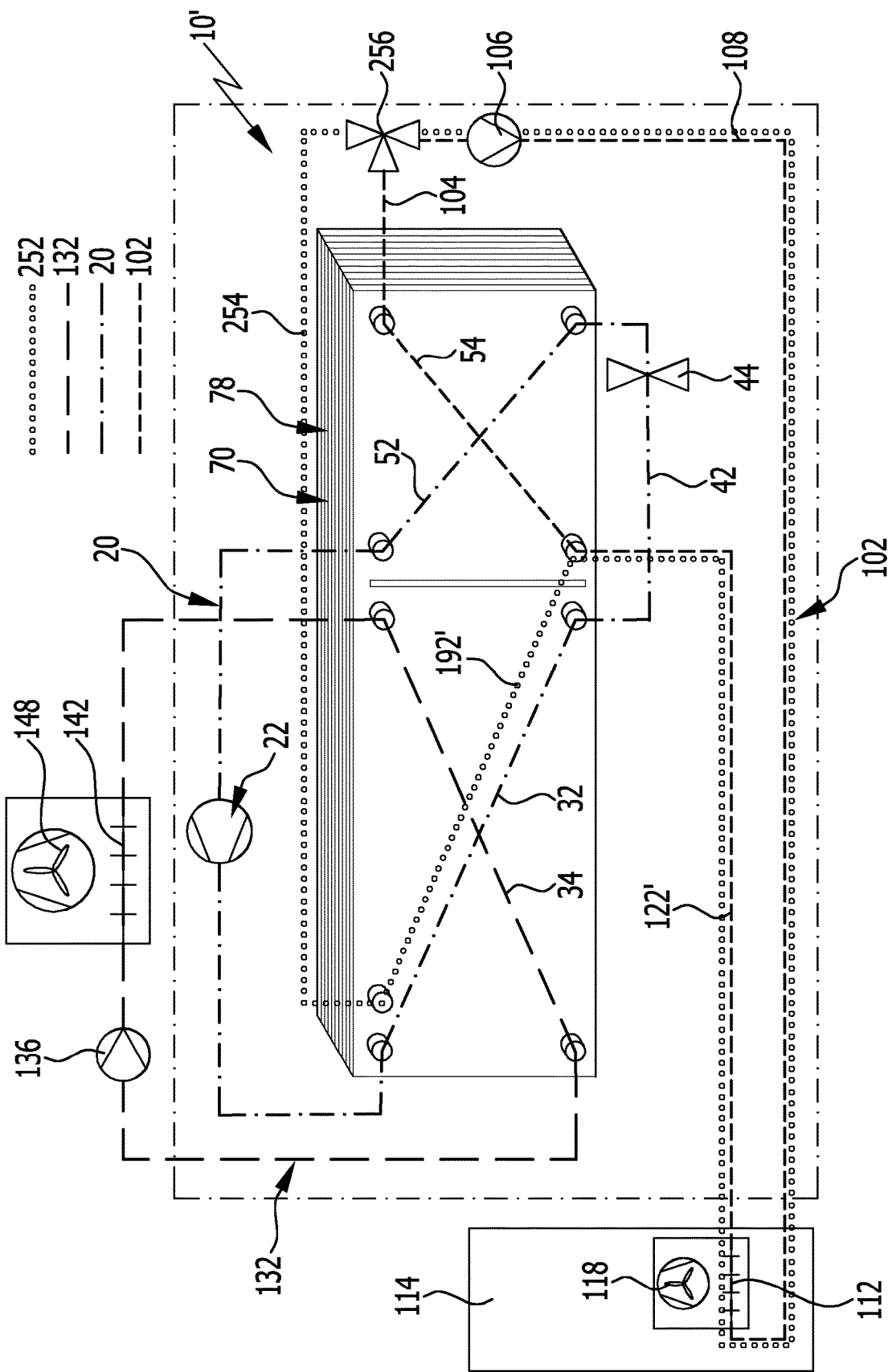
FIG. 5 shows a schematic depiction similar to FIG. 2 of the media guidance in the second exemplary embodiment of the cold generator according to the invention and the refrigerating plant.

In a second exemplary embodiment of a cold generator 10' according to the invention, shown in FIGS. 4 and 5, those parts that are identical to those of the first exemplary embodiment are provided with the same reference numerals, and therefore reference can be made fully to the explanations provided for them in the first exemplary embodiment.

This is true in particular for the heat exchanger 30 and the heat exchanger 50, and the internal heat exchanger 90.

In the same way, the structure of the flow path layer stack 78 of the heat exchanger unit 70 is similar to the first exemplary embodiment, with the sole difference that the flow path 192' in the flow path layer 172 comprised by the heating heat exchanger 170' is used to defrost the heat exchanger 122 in the first heat transport circuit 102 differently from the way described for the first exemplary embodiment.

To this end, on account of a redirection system 252, the return conduit 122' of the first heat transport circuit 102 is configured such that it supplies the first heat transport medium flowing back from the heat exchanger 112 both to the heat transport flow path 54 and to the flow path 192', which in this exemplary embodiment of the heat exchanger unit 70, however, is arranged directly adjacently to the heat transport flow path 34 of the flow path layer 74, wherein the flow path 192' is preferably arranged overlapping with the heat transport flow path 34 for forming the heating heat exchanger 170', such that it is possible to heat the heat transport medium guided in the first heat transport circuit 102, as it flows through the flow path 192', by means of the warm second heat transport medium in the second heat transport flow path 34.

To this end, the redirection system 252 comprises a return conduit 254 for the first heat transport medium of the first heat transport circuit 102 heated in the heat transport flow path 192', wherein the return conduit 254 leads into a three-way valve 256, which is arranged in the intake conduit 104 guided to the circulating pump 106 and makes it possible either to draw in first heat transport medium from the heat transport flow path 54 by means of the intake conduit 104, or, if the three-way valve 256 is switched, to draw in heat transport medium from the heat transport flow path 192' which has been heated by the heat transport flow path 34 and thus can be used to defrost the heat exchanger 112 in the first heat transport circuit 102.

Figure 6:
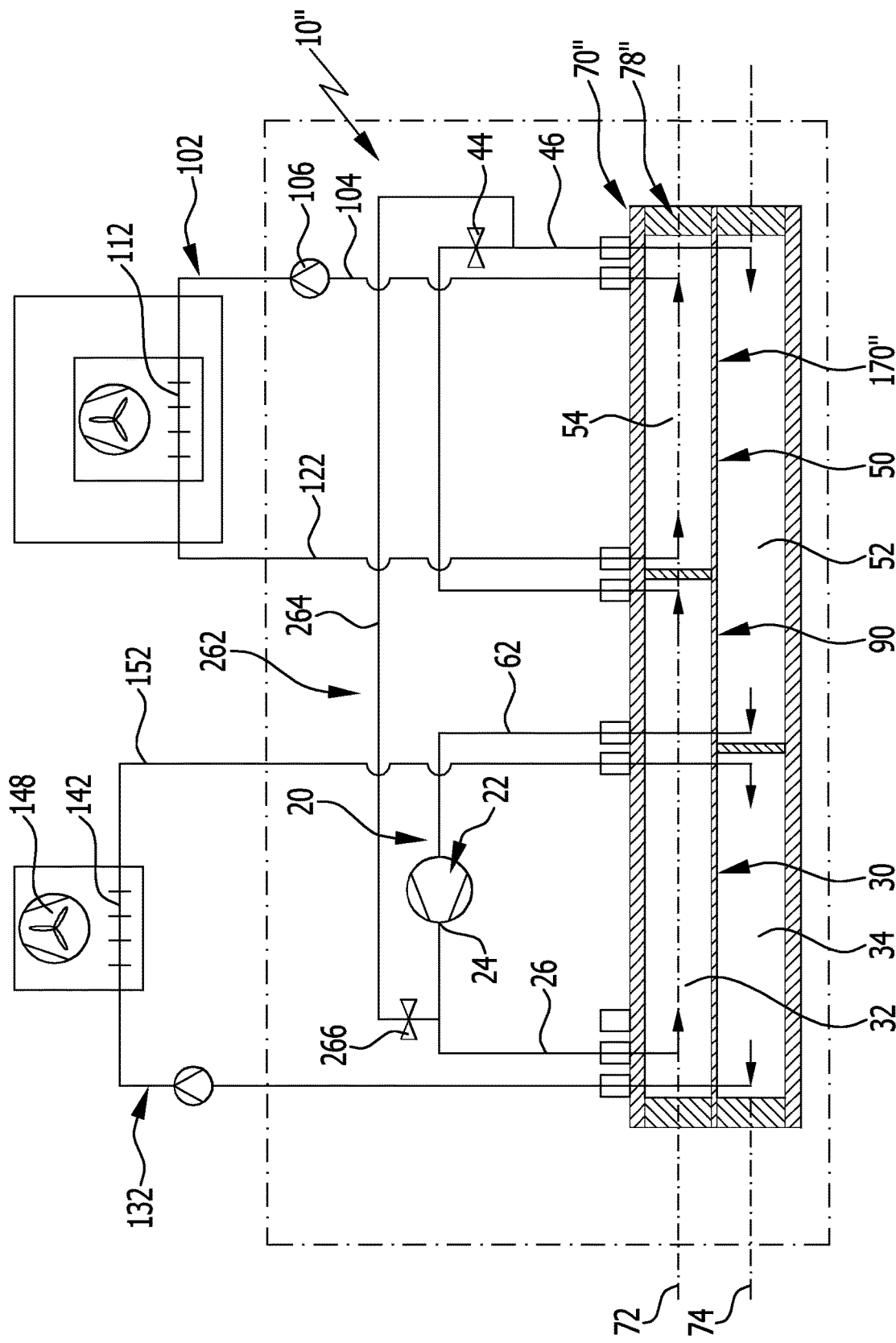
FIG. 6 shows a schematic depiction similar to FIG. 1 of a third exemplary embodiment of a cold generator according to the invention used in the first embodiment of the refrigerating plant.
Figure 7:
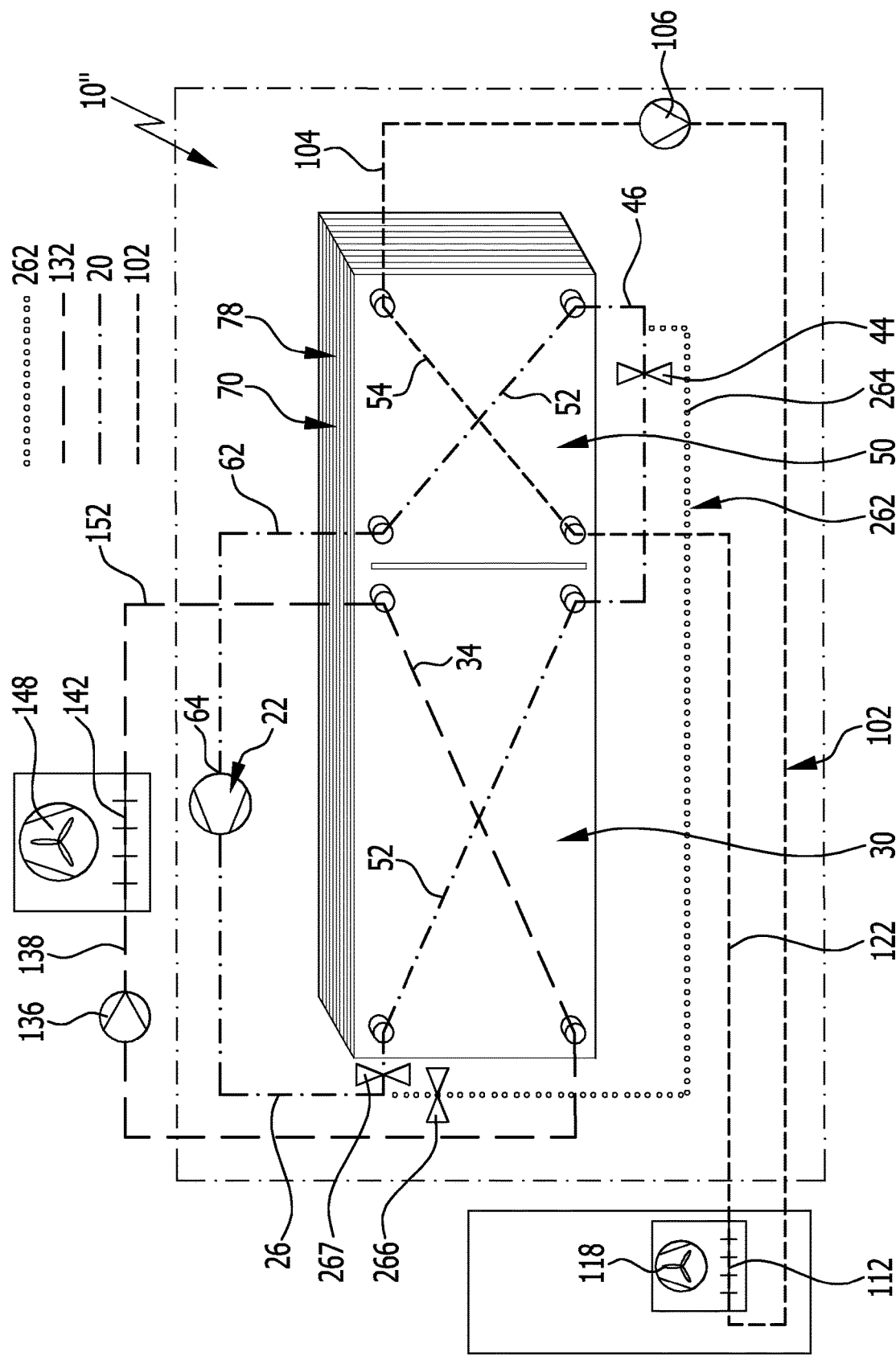
FIG. 7 shows a schematic depiction similar to FIG. 2 of the third exemplary embodiment of the cold generator according to the invention and the refrigerating plant.
Figure 8:
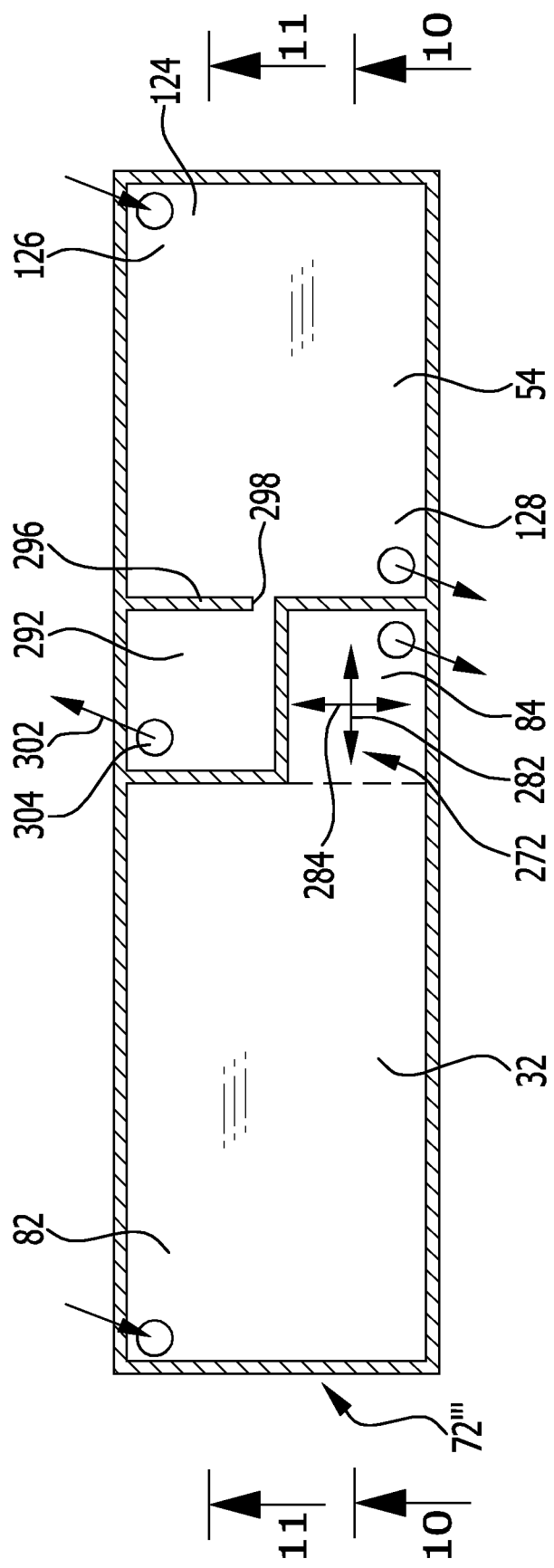
FIG. 8 shows a schematic plan view of a first flow path layer of a third exemplary embodiment of a cold generator.
Figure 9:
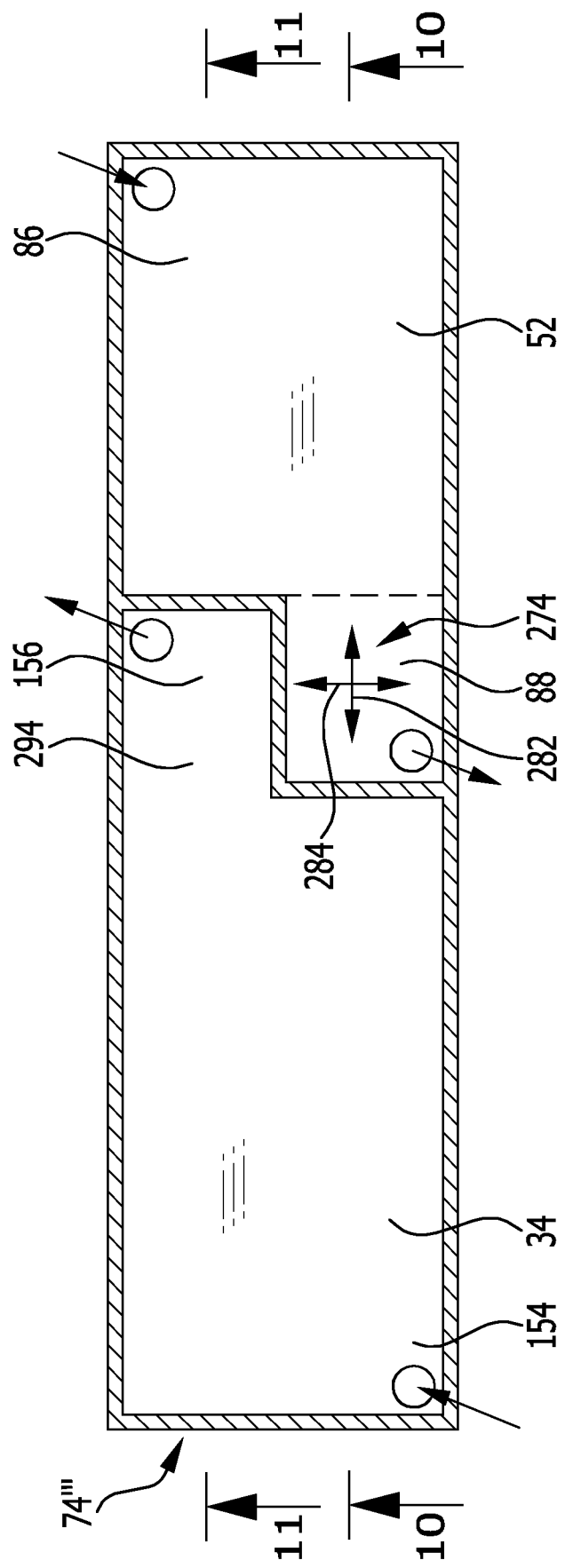
FIG. 9 shows a schematic plan view similar to FIG. 8 of a second flow path layer of the third exemplary embodiment.
Figure 10:
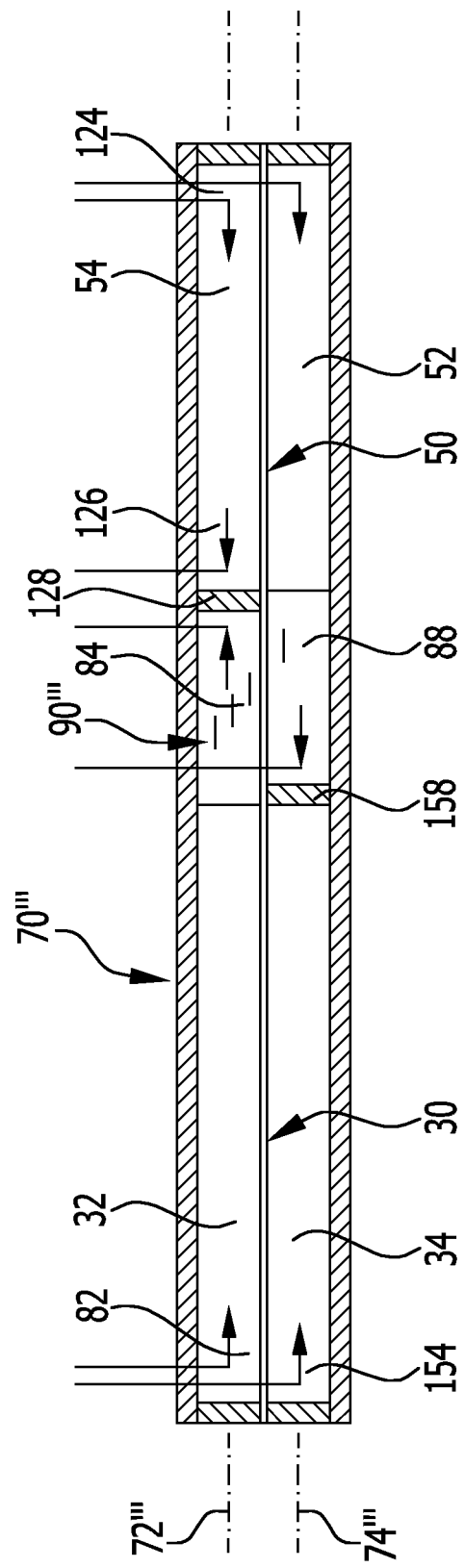
FIG. 10 shows a section along line 10-10 in FIGS. 8 and 9 through the flow path layers combined to form the flow path layer stack.
Figure 11:
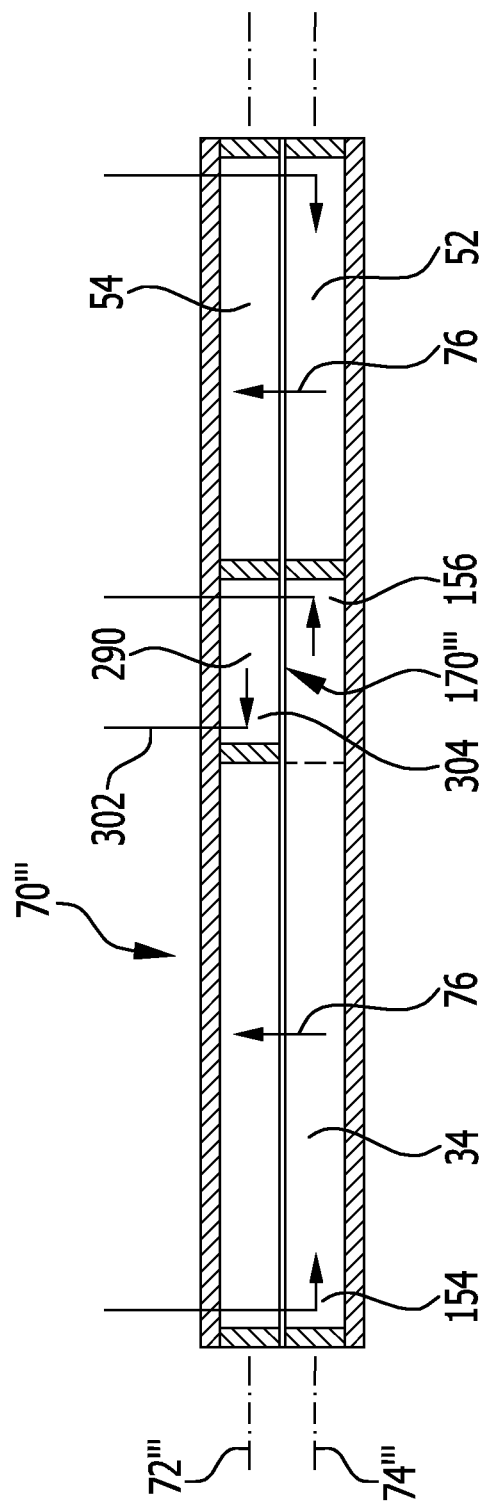
FIG. 11 shows a section similar to FIG. 10 along line 11-11 in FIGS. 8 and 9.

In a third exemplary embodiment of a cold generator 10" according to the invention, shown in FIGS. 6 and 7, those elements which are identical to those in the previous exemplary embodiments are provided with the same reference numerals, such that, in respect of a description of said elements, reference can be made fully to the explanations of the previous exemplary embodiments.

In contrast to the first and second exemplary embodiment, the heat exchanger unit 70" in the flow path layer stack 78" comprises merely the flow path layers 72 and 74, of which—as already mentioned in conjunction with the first exemplary embodiment—not only two, but more than two may be arranged successively in the flow path layer stack 78".

In this regard, the heat-emitting heat exchanger 30 integrated in the heat exchanger unit 70 and the heat-absorbing heat exchanger 50 as well as the internal heat exchanger 90 are formed in the same way as in the first exemplary embodiments, such that in this regard reference can be made fully to the previous explanations.

In addition, the first heat transport circuit 102 and the second heat transport circuit 132 are also formed identically as compared to the first exemplary embodiment.

Furthermore, in normal operation, that is to say when there is no defrosting taking place of the heat exchanger 112, the refrigerant circuit 20 is also formed as in the first exemplary embodiment.

In contrast to the first exemplary embodiment, in order to heat the heat transport medium in the first heat transport circuit 102 it is provided that the heat-absorbing refrigerant flow path 52, instead of being passed through by expanded refrigerant, is passed through by heated refrigerant at high pressure, as is available at the high-pressure connection 24 of the refrigerant compressor 22.

To this end a recirculation system 262 is provided, which comprises a branch conduit 264 branching off from the high-pressure conduit 26, which branch conduit can be shut off by a shut-off valve 266 and leads into the supply conduit 46 provided between the expansion member 44 and the refrigerant flow path 52, such that instead of the cold refrigerant expanded by the expansion member 44, gaseous refrigerant under high pressure and heated by the compression in the refrigerant compressor 22 is supplied to the refrigerant flow path 52, and after having passed through the refrigerant path 52 is supplied again to the intake connection 64 of the refrigerant compressor 22 by means of the return conduit 62.

A heating heat exchanger 170" is formed temporarily, in which a heating of the first heat transport medium in the first heat transport circuit 102 occurs as the first heat transport medium flows through the heat transport flow path 54, and therefore the heat exchanger 112 can be defrosted.

In order to prevent refrigerant from still flowing through the refrigerant flow path 52 in this case, it is preferably provided that the expansion member 44 is controllable and possibly can be controlled such that it does not expand a notable quantity of refrigerant.

A shut-off valve 267 is also preferably provided in the supply conduit to the refrigerant flow path 52 and prevents an accumulation of refrigerant in the refrigerant flow path 52 when the first heat transport medium is to be temporarily heated in the heating heat exchanger 170′′′.

Alternatively, the shut-off valves 266 and 267 can be combined to form a three-way valve.

In a fourth exemplary embodiment of a cold generator 10′′′ according to the invention, shown in FIGS. 8 to 12, the heat exchanger unit 70 is likewise formed from flow layer paths 72′′′ and 74′′′, wherein the flow path layer 72′′′, in the same way as described in the previous exemplary embodiments, has the heat-emitting refrigerant flow path 32 and the heat-emitting first heat transport flow path 54, and the flow path layer 74′′′ has the heat-absorbing second heat transport flow path 34 and the heat-absorbing refrigerant flow path 52.

Furthermore, the heat-emitting refrigerant flow path 32 and the heat-absorbing second heat transport flow path 34 also form the heat exchanger 30, and the heat-absorbing refrigerant flow path 52 and the heat-emitting first heat transport flow path 54 also form the heat exchanger 50.

In addition, the heat-emitting refrigerant flow path 32 and the heat-absorbing refrigerant flow path 52 overlap one another in the region of their refrigerant outlet sides 84 and 88 for forming the internal heat exchanger 90′′′, however the overlap of the heat-emitting refrigerant flow path 32 overlaps with the heat-absorbing refrigerant flow path 52 merely in partial surface regions 272 and 274 of the flow path layers 72′′′ or 74′′′, wherein the partial surface regions 272, 274 extend for example in an overlap direction 282 which defines the overlap of the flow path layers 32 and 54 in a direction in which the flow path layers 32 and 52 each run towards one another starting from their refrigerant inlet sides 82 and 86 and in a transverse direction 284, which is merely part of the transverse extent of the refrigerant flow paths 32 and 52 in the region of the heat exchangers 30 and 50.

It is thus made possible to create a heating heat exchanger 170′′′ by overlapping a partial surface region 292 of the flow path layer 72′′′ and a partial surface region 294 of the flow path layer 74′′′.

The second heat transport flow path 34 extends into the partial surface region 294 such that the outlet side 156 is situated in said region.

The partial surface region 292 also forms an additional flow path 290, which branches off from the first heat transport flow path 54.

A discharge conduit 302 for first heat transport medium heated in the additional flow path 290 is associated with said additional flow path, wherein in normal operation with inactive heating heat exchanger 170′′′, the first heat transport medium flows from the inlet side 124, which for example is arranged overlapping with the refrigerant inlet side 86, to the outlet side 126 of the first heat transport flow path 54, and does not enter the additional flow path 290 of the flow path layer 72′′′, which is separated by a partition 296 from the first heat transport flow path 54, as this is passed through by the first heat transport medium in normal operation of the cold generator 10′′′.

The partition 292, however, is provided with an aperture 298, which allows first heat transport medium to pass from the first heat transport flow path 54 into the additional flow path 290 comprised by the heating heat exchanger 170′′′ if the first transport medium is prevented from escaping in the outlet region 126.

In this case the first heat transport medium flows through the aperture 298 and enters the additional flow path 290, starting from which a diversion 302 occurs in a heating outlet region 304 arranged opposite the aperture 298.

The partial region 292 comprising the additional flow path 290 overlaps with the partial region 294 in which the outlet side 156 of the heat transport flow path 34 lies, such that in the heating heat exchanger 170′′′ it is possible to heat the first heat transport medium, heated in the second heat transport flow path 34, by a heat transfer in the stack direction 76, when this first heat transport medium flows through the additional flow path 290.

Also in the case of the second heat transport flow path 34, the inlet side 154 lies overlapping with the refrigerant inlet side 82, whereas the outlet side 156 is arranged in the partial region 294 of the flow path layer 74′′′, which is arranged offset next to the partial region 274, for example in the transverse direction 284.

Figure 12:
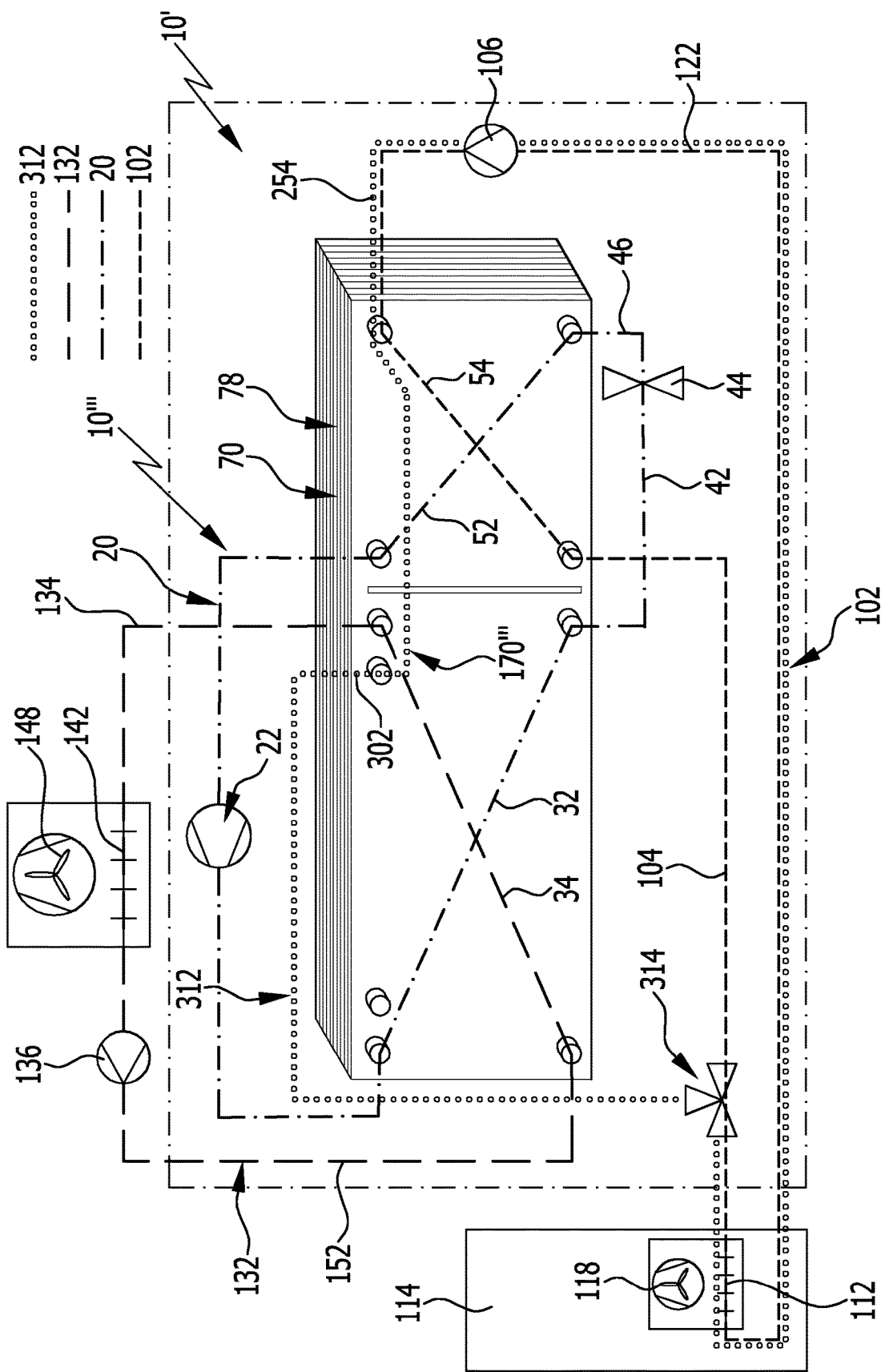
FIG. 12 shows a schematic depiction similar to FIG. 5 of the media guidance in the third exemplary embodiment of the cold generator.

Furthermore, as is shown in FIG. 12, a redirection system 312 is associated with the first heat transport circuit 102 and comprises the diverting conduit 302, which leads to a three-way valve 314, which is arranged in the intake conduit 104 of the first heat transport circuit 102 and allows either the first heat transport medium, which flows in the first heat transport flow path 54, to flow in the direction of the outlet side 126 or to enter the heating heat exchanger 170′′′ through the aperture 298 and to flow there in the additional flow path 290 in the direction of the heating outlet side 304, such that with this course of flow of the first heat transport medium the first heat transport medium is heated by the second heat transport medium.

For the rest, all of those elements that are identical to the previous exemplary embodiments are also provided with the same reference numerals in the fourth exemplary embodiment, and therefore reference can be made fully to the explanations of the previous exemplary embodiments in respect of the description of said elements.

Figure 13:
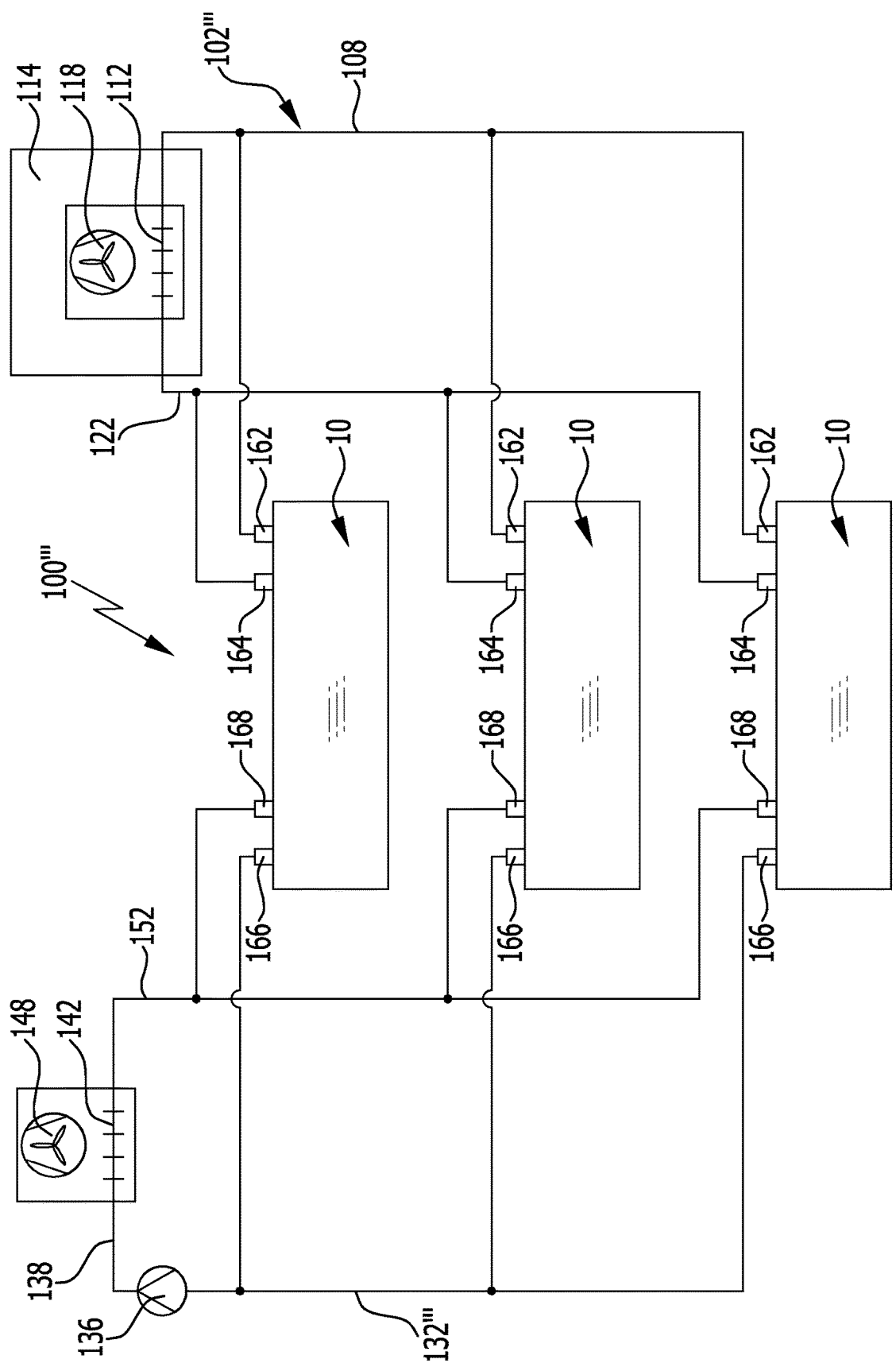
FIG. 13 shows a schematic depiction of a third embodiment of the refrigerating plant with a plurality of cold generators.

A further possible use of the cold generator 10 according to the invention in a refrigerating plant 100′′′, formed in particular as a cold generator module 10, is shown in FIG. 13.

Here, it is conceivable to use a plurality of cold generators 10 in parallel in the first heat transport circuit 102 and at the same time to connect these cold generators 10 in parallel to the second heat transport circuit 132′′′.

It is thus possible to provide different refrigeration capacities at least in the first heat transport circuit 102′′′ optionally redundantly or by variable connection of individual cold generators 10.

The connection to the first refrigerant circuit 102′′′ is achieved by means of the quick coupling elements 162 and 164, and the connection to the second heat transport circuit 132′′ is achieved by means of the quick coupling elements 166, 168.

Otherwise, the cold generators 10 operate for example in accordance with one of the preceding exemplary embodiments.

The invention claimed is:

1. A cold generator, comprising a refrigerant circuit with a refrigerant compressor arranged in the refrigerant circuit, a heat-emitting heat exchanger connected to a high-pressure connection of the refrigerant compressor, an expansion member following on from the heat-emitting heat exchanger, and a heat-absorbing heat exchanger following on from the expansion member, which heat-absorbing heat exchanger is in turn connected on the output side to an intake connection of the refrigerant compressor, wherein the cold generator comprises a heat exchanger unit in which the heat-emitting heat exchanger and the heat-absorbing heat exchanger are integrated, wherein the heat exchanger unit comprises a flow path layer stack which is built up in a stacked construction and has flow path layers arranged successively in a stack direction, wherein, in order to form the heat-emitting heat exchanger in the flow path layer stack, at least one heat-emitting refrigerant flow path and at least one heat-absorbing second heat transport flow path are provided, wherein a second heat transport medium guided in a second heat transport circuit flows or is arranged to flow through the second heat transport flow path, wherein at least one heat-absorbing refrigerant flow path and at least one heat-emitting first heat transport flow path are provided in order to form the heat-absorbing heat exchanger in the flow path layer stack, and wherein a first heat transport medium guided in a first heat transport circuit flows or is arranged to flow through the first heat transport flow path;

wherein the heat-emitting refrigerant flow path and the heat-emitting first heat transport flow path are arranged in a first common flow path layer of the flow path layer stack; and wherein the heat-absorbing refrigerant flow path and the heat-absorbing second heat transport flow path are arranged in a second common flow path layer of the flow path layer stack.

2. The cold generator in accordance with claim 1, wherein the at least one heat-emitting refrigerant flow path and the at least one heat-absorbing second heat transport flow path for the second heat transport medium are arranged in the heat-emitting heat exchanger in flow path layers arranged successively in the stack direction, and the heat exchange occurs parallel to the stack direction.

3. The cold generator in accordance with claim 1, wherein the at least one heat-absorbing refrigerant flow path and the at least one heat-emitting first heat transport flow path for the first heat transport medium are arranged in the heat-absorbing heat exchanger in flow path layers arranged successively in the stack direction, and the heat exchange occurs parallel to the stack direction.

4. The cold generator in accordance with claim 1, wherein the heat-emitting heat exchanger and the heat-absorbing heat exchanger are arranged adjacently in the heat exchanger unit in a direction transverse to the stack direction.

5. The cold generator in accordance with claim 1, wherein the heat-emitting heat exchanger and the heat-absorbing heat exchanger are arranged at a distance from one another in a direction transverse to the stack direction.

6. The cold generator in accordance with claim 1, wherein an inner heat exchanger is arranged between the heat-emitting heat exchanger and the heat-absorbing heat exchanger.

7. The cold generator in accordance with claim 6, wherein the inner heat exchanger is formed by overlapping the heat-emitting refrigerant flow path in a flow path layer and the heat-absorbing refrigerant flow path in an adjacent flow path layer.

8. The cold generator in accordance with claim 6, wherein in the inner heat exchanger the refrigerant is cooled in the region of a refrigerant outlet side of the heat-emitting refrigerant flow path and the refrigerant is heated in the region of a refrigerant outlet side of the heat-absorbing refrigerant flow path.

9. The cold generator in accordance with claim 6, wherein the heat-emitting refrigerant flow path has a refrigerant inlet side and a refrigerant outlet side and the heat-absorbing refrigerant flow path has a refrigerant inlet side and a refrigerant outlet side, and in that the refrigerant outlet side of the heat-emitting refrigerant flow path and the refrigerant outlet side of the heat-absorbing refrigerant flow path are arranged overlapping one another.

10. The cold generator in accordance with claim 1, wherein, in order to temporarily heat the first heat transport medium in the first heat transport circuit in the heat exchanger unit, heat is suppliable to the first heat transport medium, wherein the flow paths for the first heat transport medium and the second heat transport medium remain separate.

11. The cold generator in accordance with claim 1, wherein the cold generator has a redirection system for heat transport medium, by means of which system heat is suppliable to the first heat transport medium in the heat exchanger unit by redirecting heat transport medium.

12. The cold generator in accordance with claim 1, wherein the heat exchanger unit comprises a heating heat exchanger for temporarily heating the first heat transport medium.

13. The cold generator in accordance with claim 12, wherein, in order to form the heating heat exchanger, at least one flow path layer of the heat exchanger unit has at least one additional flow path for temporarily heating the first heat transport medium.

14. The cold generator in accordance with claim 13, wherein the at least one additional flow path is provided in a flow path layer which in the stack direction borders one of the heat-emitting first heat transport flow paths for the first heat transport medium, is arranged overlapping therewith, and can be passed through by the second heat transport medium.

15. The cold generator in accordance with claim 13, wherein the at least one additional flow path for heating the first heat transport medium can be passed through by the first heat transport medium, borders the at least one heat-absorbing heat transport flow path for the second heat transport medium in the stack direction, and is arranged overlapping therewith.

16. The cold generator in accordance with claim 12, wherein the at least one additional flow path is arranged in an additional flow path layer of the heat exchanger unit.

17. The cold generator in accordance with claim 12, wherein the at least one additional flow path is arranged in the same flow path layer as one of the heat transport flow paths.

18. The cold generator in accordance with claim 17, wherein the at least one first heat transport flow path through which the first heat transport medium passes extends from an inlet side to an outlet side, and in that the respective additional heat transport path branches off from the first heat transport flow path and runs to a heating outlet side.

19. The cold generator in accordance with claim 13, wherein the at least one additional flow path is formed by a partial surface region of one of the flow path layers.

20. The cold generator in accordance with claim 19, wherein the additional flow path is arranged overlapping with the second heat transport flow path.

21. The cold generator in accordance with claim 13, wherein the additional flow path is arranged overlapping with an outlet side of the second heat transport flow path.

22. The cold generator in accordance with claim 1, wherein, by means of a redirection system for refrigerant, heated refrigerant is supplied at high pressure to the heat-absorbing refrigerant flow path by the compression instead of expanded refrigerant at low pressure by the expansion member.

23. The cold generator in accordance with claim 1, wherein the heat-absorbing heat transport flow path is configured to guide a liquid heat transport medium.

24. The cold generator in accordance with claim 1, wherein the second heat transport medium circulating in the second heat transport circuit is a liquid heat transport medium, and in that in particular a second heat-emitting heat exchanger is connectable to the second heat transport circuit.

25. The cold generator in accordance with claim 1, wherein the heat-emitting heat transport flow path is configured to guide a liquid heat transport medium.

26. The cold generator in accordance with claim 1, wherein the first heat transport medium circulating in the first heat transport circuit is a liquid heat transport medium, and in that in particular a heat-absorbing heat exchanger is connectable to the first heat transport circuit.

27. The cold generator in accordance with claim 1, wherein the flow path layer stack is formed by structural layers defining the various flow paths in the various flow path layers, and by cover layers (204) closing the structural layers in the stack direction.

28. The cold generator in accordance with claim 27, wherein a cover layer is arranged between each two structural layers arranged successively in the stack direction.

29. The cold generator in accordance with claim 1, wherein the cold generator comprises all refrigerant conduits leading to the refrigerant flow paths (32, 52) and the expansion member of the refrigerant circuit.

30. The cold generator in accordance with claim 1, wherein the cold generator has conduit portions of the second heat transport circuit connected to the heat-absorbing heat transport flow path layer and leading to coupling elements.

31. The cold generator in accordance with claim 1, wherein the cold generator has conduit portions of the first heat transport circuit connected to the heat-emitting heat transport flow path layer and leading to coupling elements.

32. The cold generator in accordance with claim 1, wherein the cold generator comprises a circulating pump for the first heat transport circuit.

33. The cold generator in accordance with claim 1, wherein the components comprised by the cold generator are combined by means of a module base to form a cold generator module.

34. The cold generator in accordance with claim 33, wherein at least the refrigerant compressor and the heat exchanger unit are held on the module base.

35. A refrigerating plant for cooling a space that is to be cooled, wherein a heat exchanger is arranged in the space that is to be cooled, which heat exchanger is arranged in a first heat transport circuit operating with liquid first heat transport medium, and wherein the refrigerating plant has the cold generator in accordance with claim 1.

36. The refrigerating plant in accordance with claim 35, wherein the first heat transport medium is a water-based heat transport medium.

37. The refrigerating plant in accordance with claim 35, wherein the first heat transport medium is circulated in the first heat transport circuit by generation of a pressure difference of at most 2 bar.

38. The refrigerating plant in accordance with claim 35, wherein the refrigerating plant has a heat exchanger which is arranged in a second heat transport circuit operating with liquid second heat transport medium.

39. The refrigerating plant according to claim 38, wherein the second heat transport medium is a water-based heat transport medium.

40. The refrigerating plant in accordance with claim 38, wherein the second heat transport medium is circulated in the second heat transport circuit by generation of a pressure difference of at most 2 bar.

\* \* \* \* \*